US007981532B2

(12) United States Patent
Mori et al.

(10) Patent No.: US 7,981,532 B2
(45) Date of Patent: Jul. 19, 2011

(54) PHASE-CHANGE SUBSTANCE, THERMAL CONTROL DEVICE AND METHODS OF USE THEREOF

(75) Inventors: Toru Mori, Tokyo (JP); Yoshimi Kubo, Tokyo (JP); Akira Okamoto, Tokyo (JP); Yasuyuki Nakamura, Tokyo (JP)

(73) Assignees: NEC Corporation, Tokyo (JP); NEC Toshiba Space Systems, Ltd., Tokyo (JP)

( * ) Notice: Subject to any disclaimer, the term of this patent is extended or adjusted under 35 U.S.C. 154(b) by 0 days.

(21) Appl. No.: 12/088,389

(22) PCT Filed: Sep. 28, 2006

(86) PCT No.: PCT/JP2006/319309
§ 371 (c)(1),
(2), (4) Date: Mar. 27, 2008

(87) PCT Pub. No.: WO2007/037332
PCT Pub. Date: Apr. 5, 2007

(65) Prior Publication Data
US 2008/0311428 A1    Dec. 18, 2008

(30) Foreign Application Priority Data
Sep. 28, 2005 (JP) ................................ 2005-281962

(51) Int. Cl.
*C01F 17/00* (2006.01)
*B32B 9/00* (2006.01)
(52) U.S. Cl. ...................... 428/701; 252/182.1; 423/263
(58) Field of Classification Search .................. None
See application file for complete search history.

(56) References Cited

U.S. PATENT DOCUMENTS

| 4,789,561 | A  | * | 12/1988 | Schaefer et al. | ........... 427/126.1 |
| 5,503,815 | A  |   | 4/1996  | Ishii et al. | |
| 6,300,638 | B1 | * | 10/2001 | Groger et al. | ............. 250/458.1 |
| 6,593,014 | B1 | * | 7/2003  | Ogimoto et al. | ........... 428/848.8 |
| 6,667,146 | B1 | * | 12/2003 | Ogimoto et al. | ......... 430/270.13 |

(Continued)

FOREIGN PATENT DOCUMENTS
EP    0650927 A1    5/1995
(Continued)

OTHER PUBLICATIONS

Vazquez-Vazqez C et al. "Characterization of LAO .67CAO. 33MEGA Particles Prepared by the Sol-Gel Route", Journal of Materials Chemistry, The Royal Society of Chemistry, Apr. 1, 1998, pp. 991-1000, vol. 8 No. 4, Cambridge, GB.

(Continued)

*Primary Examiner* — Timothy M Speer
*Assistant Examiner* — Vera Katz
(74) *Attorney, Agent, or Firm* — Sughrue Mion, PLLC

(57) ABSTRACT

In an Mn-containing perovskite oxide which is a conventional phase-change substance $(A_{1-x}B_x)MnO_3$, when the mixing amount x is increased, the transition temperature (Tc) is shifted to higher temperature side, but the slope of a change in the emittance become gentle and $\Delta\epsilon$ ($\epsilon$ at higher temperature-$\epsilon$ at lower temperature) also become small. In the present invention, the compositional formula of the phase-change substance is the Mn-containing perovskite oxide represented by $(A_{1-x}B_x)Mn_{1+y}O_3$ with $0<y$ in which the Mn ratio is changed from stoichiometric composition, thereby shifting the transition temperature (Tc) to a higher temperature with the emittance characteristic thereof comparable to that of the phase-change substance having the composition which is not changed from stoichiometric composition.

10 Claims, 4 Drawing Sheets

U.S. PATENT DOCUMENTS

2002/0122967 A1* 9/2002 Gorina et al. .................. 429/30
2006/0016371 A1* 1/2006 Yadav .......................... 106/400

FOREIGN PATENT DOCUMENTS

| JP | 01-212699 | | 8/1989 |
|---|---|---|---|
| JP | 7-267749 | A | 10/1995 |
| JP | 2625821 | B2 | 4/1997 |
| JP | 11-217562 | A | 8/1999 |
| JP | 2000-95522 | A | 4/2000 |
| JP | 2002-120799 | A | 4/2002 |
| JP | 2003-282966 | A | 10/2003 |
| WO | 00/03947 | A1 | 1/2000 |

OTHER PUBLICATIONS

Wein-Duo Yang et al., "Influence of Molar Ratio of Citric Acid to Metal Ion on Preparation of La0.67Sr0. 33Mn03 Materials Via Polymerizable Complex Process", Journal of the European Ceramic Society, Nov. 1, 2005, pp. 3611-3618, vol. 25 No. 16, Elsevier Science Publishers, Barking, Essex, GB.

* cited by examiner

Temperature dependence of total hemispherical emittance of $La_{1-x}Sr_xMnO_3$ (x=0, 0.15, 0.175, 0.2, 0.3 and 0.4).

PHASE-CHANGE SUBSTANCE, THERMAL CONTROL DEVICE AND METHODS OF USE THEREOF

TECHNICAL FIELD

The present invention relates to thermal control devices, particularly to thermal control devices which make the temperature environment of a house, an automobile, a transport machine, or the like suitable by using the building material therefor.

BACKGROUND ART

In a temperate climate, air temperature becomes relatively low during the winter season and relatively high during the summer season. For the climate, traditional houses had structures relatively well ventilated so that they are comfortable during the summer. In winter, the structures had the disadvantages that the interior of rooms takes a long time to become warm because of the influence of outside air when a heater is turned on to warm the interior temperature, and further cools off rapidly upon turning off the heater.

In recent years, the use of a heating and cooling equipment such as an air-conditioner has enabled the interior to be readily cooled and heated. For efficiency enhancement in a heating and cooling equipment, a house preferably has an airtight structure; thus, in a recent house the structure having good airtightness and further having a high heat-insulating property is adopted. The enhanced house airtightness has improved not only the efficiency of cooling but also that of heating.

A high heat-insulated house has a structure in which the heat caused by indoor living is also less easily exhausted to the outdoor, which leads to an increase of the room temperature due to the heat even in a state relatively low in outside air temperature and requires that the room temperature be forcibly reduced using an air conditioner.

Thus, there is a need for the development of a structure which maintains the airtightness of the house and reduces the cooling load or which exhausts the heat caused by indoor living to the outdoor without using an air conditioner.

Similarly, in recent automobiles, the improved airtightness has eliminated the indoor thereof getting colder in a state in which they are parked in the outdoors in winter, but, in summer, the indoor has an extremely increased temperature compared to the outside air.

The above-mentioned problems can be solved by using a material which not easily emits heat at lower temperature and easily emits heat when it reaches a certain temperature or higher.

Patent Documents 1 and 2 disclose an Mn-containing perovskite oxide represented by the compositional formula $(A_{1-x}B_x)MnO_3$ as a thermal control device for suitably temperature-controlling equipment aboard a spacecraft such as an artificial satellite. The material is a phase-change substance which is an insulating substance in the higher-temperature phase and has a metallic property in the lower-temperature phase, and which has a larger heat-emitting amount in the higher-temperature phase and a smaller heat-emitting amount in the lower-temperature phase. Thus, the use of the material enables the above problems to be solved. In addition, the phase-change substance has a property in which a temperature (transition temperature) causing a change from the higher-temperature phase to the lower-temperature phase can be changed by modifying the composition ratio and further in which the heat-emitting amount rapidly decreases at the transition temperature or lower.

However, the phase-change substance represented by $A_{1-x}B_xMnO_3$ disclosed in Patent Document 1 has a transition temperature of 280 to 300 K (about 10 to 30° C.). Here, when the phase-change substance is used as a house building material or the like, it is desired that it has a further increased transition temperature.

It is disclosed that increasing the mixing amount x can change the transition temperature from 250 K to 350 K. However, the substance has the disadvantage that increasing the mixing amount x to shift the transition temperature to higher temperatures allows the emittance change to tend to be mild and decreases the emittance change width $\Delta\epsilon$ ($\epsilon$ at higher temperature–$\epsilon$ at lower temperature).

Patent Document 1: Japanese Patent Application Laid-Open No. 11-217562
Patent Document 2: Japanese Patent Application Laid-Open No. 2002-120799

DISCLOSURE OF THE INVENTION

Problem to be Solved by the Invention

The Mn-containing perovskite oxide which is a phase-change substance $(A_{1-x}B_x)MnO_3$ has a function in which the transition temperature (Tc) causing a rapid change in emittance can be optionally changed by changing the mixing amount x to modify the compositional ratio between A and B. However, although increasing the mixing amount x shifts Tc to a higher temperature, it makes gentle the slope of a change in the emittance around Tc and also decreases $\Delta\epsilon$ ($\epsilon$ at higher temperature–$\epsilon$ at lower temperature).

FIG. 4 is a graph showing the temperature dependence of the emittance of $(La_{1-x}Sr_x)MnO_3$ when the mixing amount x therein is varied. As shown in FIG. 4, the Tc causing a rapid change in emittance when x=0.175 and 0.2 is respectively 283 K and 309 K, which are near room temperature; and the emittance change width $\Delta\epsilon$ is about 0.4 which is the largest value.

However, although mixing amounts x of 0.2 or more can shift Tc to a higher temperature, they make mild the emittance change around Tc and further decrease $\Delta\epsilon$.

Here, the use of the Mn-containing perovskite oxide $(A_{1-x}B_x)MnO_3$ as a house building material or the like requires shifting the Tc of 283 K or 309 K at which $\Delta\epsilon$ has a larger value of about 0.4 to a temperature higher than room temperature. There is a need for a material having a larger $\Delta\epsilon$ even when Tc is shifted to a higher temperature.

Means for Solving the Problem

The present invention adopts the following technical constitution in order to achieve the above-described object.

Specifically, the present invention is a phase-change substance used in a thermal control device for controlling a temperature of an object employing the phase-change substance, which is an insulating substance in a higher-temperature phase and has a metallic property in a lower-temperature phase, and which has a larger heat-emitting amount in the higher-temperature phase and has a smaller heat-emitting amount in the lower-temperature phase, wherein: the phase-change substance is an Mn-containing perovskite oxide represented by $(A_{1-x}B_x)Mn_{1+y}O_3$; A represents at least one of rare-earth ions of La, Pr, Nd, and Sm; B represents at least one of alkaline-earth ions of Ca, Sr, and Ba; $0 \leq x \leq 1$; and $0 < y$. In the Mn-containing perovskite oxide represented by $(A_{1-x}B_x)Mn_{1+y}O_3$, it is preferable that A represents at least one of rare-earth ions of La, Pr, Nd, and Sm; B represents at least one of alkaline-earth ions of Ca, Sr, and Ba; $0 \leq x \leq 1$; and $0.005 \leq y \leq 0.1$.

In addition, the present invention is a thermal control device having a phase-change substance layer for controlling a temperature of an object by forming the layer on the object, in which the phase-change substance layer comprises a phase-change substance, which is an insulating substance in a higher-temperature phase and has a metallic property in a lower-temperature phase, and which has a larger heat-emitting amount in the higher-temperature phase and has a smaller heat-emitting amount in the lower-temperature phase, wherein: the phase-change substance is an Mn-containing perovskite oxide represented by $(A_{1-x}B_x)Mn_{1+y}O_3$; A represents at least one of rare-earth ions of La, Pr, Nd, and Sm; B represents at least one of alkaline-earth ions of Ca, Sr, and Ba; $0 \leq x \leq 1$; and $0 < y$. In the Mn-containing perovskite oxide represented by $(A_{1-x}B_x)Mn_{1+y}O_3$ as the phase-change substance, it is preferable that A represents at least one of rare-earth ions of La, Pr, Nd, and Sm; B represents at least one of alkaline-earth ions of Ca, Sr, and Ba; $0 \leq x \leq 1$; and $0.005 \leq y \leq 0.1$.

The thermal control device may be the phase-change substance layer which is in a state formed on one side of the object.

The thermal control device may be composed of the phase-change substance layer and a substrate substance layer made of a substrate substance; and may be in a state in which the substrate substance layer and the phase-change substance layer are formed on the object in that order. The substrate substance may be zirconium oxide, aluminum oxide, magnesium oxide, lanthanum oxide, tantalum oxide, or silicon nitride; or may be strontium titanate, lead zirconate titanate, lead lanthanum zirconate titanate, or lanthanum aluminate. In addition, the substrate substance layer may be composed of a first substrate substance layer made of zirconium oxide, aluminum oxide, magnesium oxide, lanthanum oxide, tantalum oxide, or silicon nitride, and of a second substrate substance layer made of strontium titanate, lead zirconate titanate, lead lanthanum zirconate titanate, or lanthanum aluminate; and may be in a state in which the first substrate substance layer, the second substrate substance layer and the phase-change substance layer are formed on the object in that order.

The object may be a building material.

The present invention may also be a thermal control device comprising the above-mentioned phase-change substance for controlling the own temperature thereof. The thermal control device may be a building material.

EFFECT OF THE INVENTION

In the Mn-containing perovskite oxide $(A_{1-x}B_x)Mn_{1+y}O_3$ of the present invention, increasing the mixing amount y can shift the transition temperature Tc to a higher temperature while maintaining a state in which $\Delta\epsilon$ has a larger value of about 0.4.

DESCRIPTION OF SYMBOLS

1 Phase-change substance film
1' Phase-change substance plate
2 Substrate substance film
3 Object
4 Thin film comprising organic resin (base film)
4' Phase change film
5 Phase-change substance particle

BEST MODE FOR CARRYING OUT THE INVENTION

The phase-change substance of the present invention is an Mn-containing perovskite oxide represented by $(A_{1-x}B_x)Mn_{1+y}O_3$, wherein A represents at least one of rare-earth ions of La, Pr, Nd, and Sm; B represents at least one of alkaline-earth ions of Ca, Sr, and Ba; and $0 \leq x \leq 1$ and $0 < y$.

In the Mn-containing perovskite oxide represented by $(A_{1-x}B_x)Mn_{1+y}O_3$, the change of the Mn mixing amount y can shift Tc to a higher temperature. Even the shift of Tc to a higher temperature by changing the Mn mixing amount y to alter the stoichiometric ratio can make the change width $\Delta\epsilon$ of the emittance around Tc comparable to that when y=1, i.e., when the stoichiometric ratio is not altered.

More preferably, y is in the range of $0.005 \leq y \leq 0.1$. When y is 0.1 or less, heat treatment for obtaining a perovskite-type crystalline structure can be carried out at the same heat treatment temperature as that when the stoichiometric ratio is not altered.

In contrast, when y is 0.005 or more, Tc can be shifted to a high temperature compared to that in the case of the stoichiometric composition.

Figure 3:
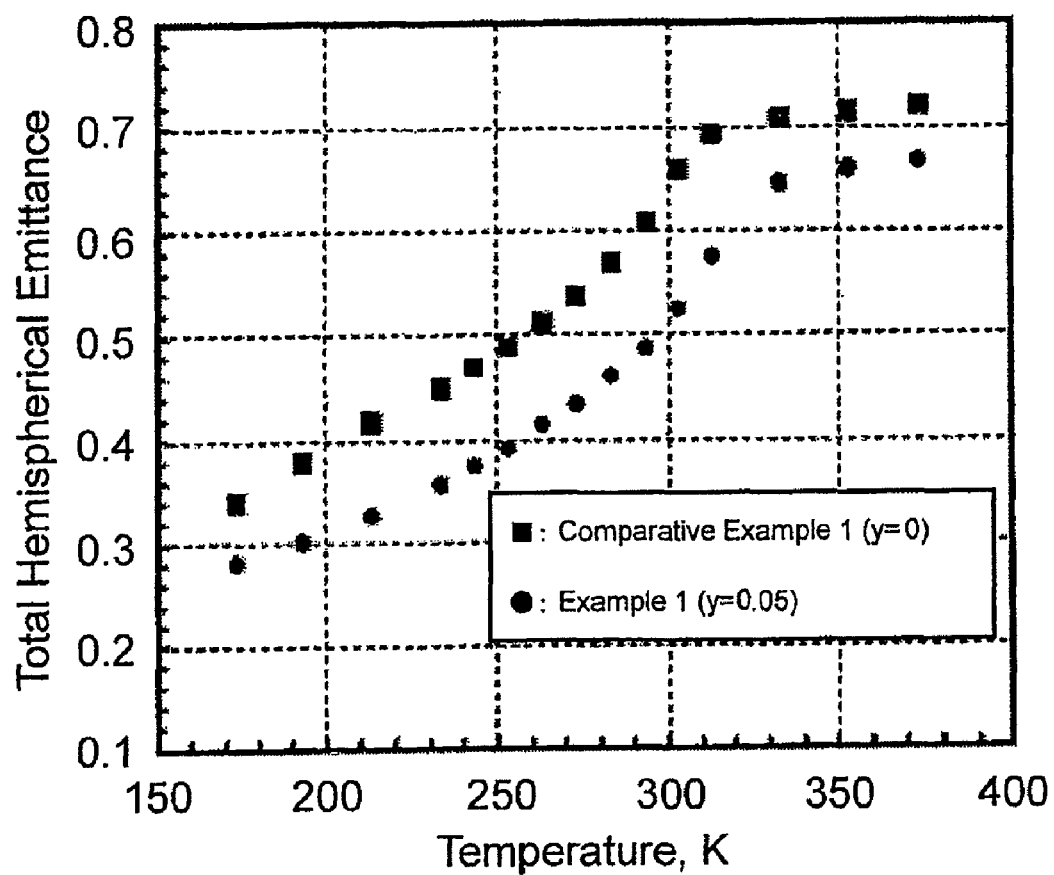
FIG. 3 is a graph showing the temperature dependence of the emittance of a phase-change substance of the present invention.
Figure 4:
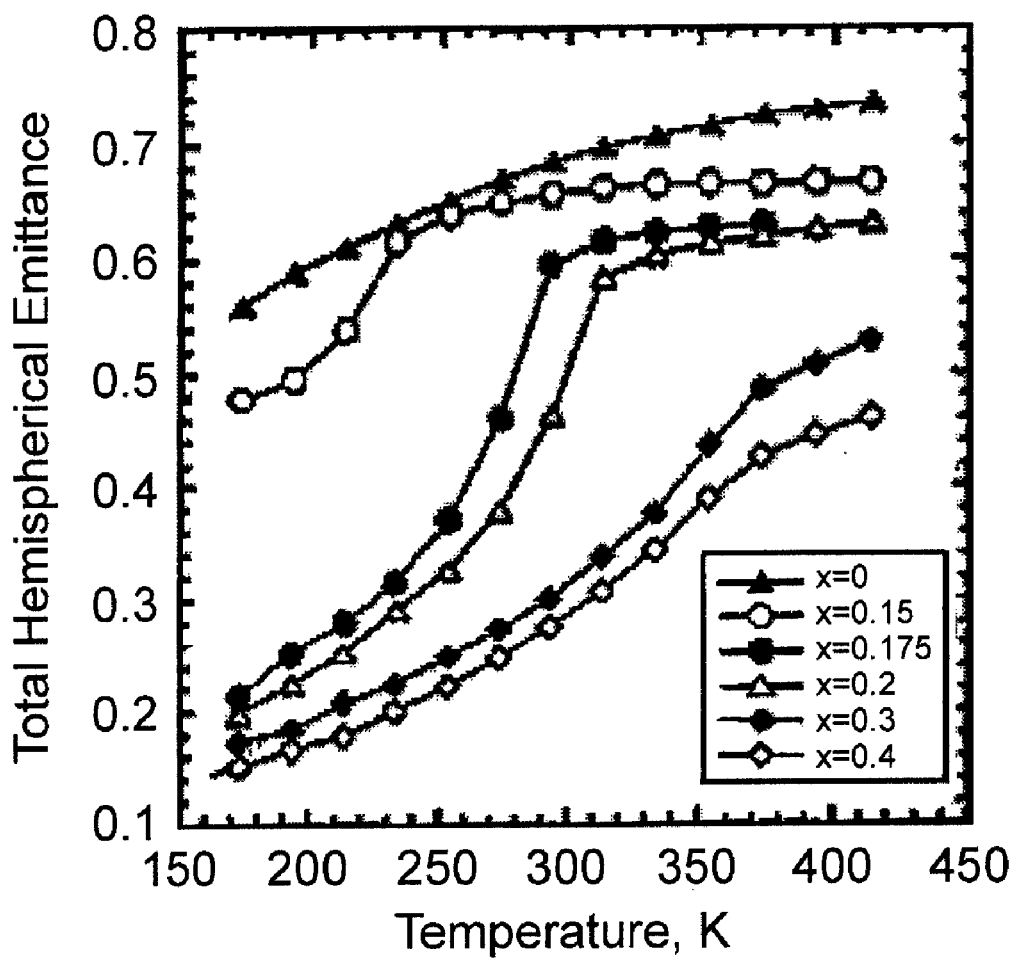
FIG. 4 is a graph showing the temperature dependence of the emittance of a related art phase-change substance.

FIG. 3 shows an example of the results of the temperature characteristic of the emittance of the phase-change substance $(A_{1-x}B_x)Mn_{1+y}O_3$. Although the compositional ratio of A and B is the same between Comparative Example 1 and Example 1, there is shown, for Example 1, the temperature characteristic of the emittance in the case of containing 5% excessive Mn (y=0.05).

The results in FIG. 3 show that Tc in Example 1 where Mn is made excessive is shifted to a higher temperature compared to that in Comparative Example 1 where Mn is not made excessive and further it can be confirmed that the change tendency of the emittance around Tc and $\Delta\epsilon$ are each comparable therebetween.

As shown from these results, the Mn mixing amount can be changed from that in the stoichiometric ratio without changing the compositional ratio of A and B to shift Tc to higher temperatures while keeping the change tendency of the emittance at around Tc and $\Delta\epsilon$ comparable to those for the stoichiometric composition.

The phase-change substance is preferably used in a thermal control device by processing it into the form of particles, fibers, a film, a plate, a block or the like.

The thermal control device of the present invention will be described in detail based on schematic cross-sectional views thereof. Hereinafter, a film-form phase-change substance layer and a plate-form phase-change substance layer are referred to as a phase-change substance film and a phase-change substance plate, respectively.

Figure 1:
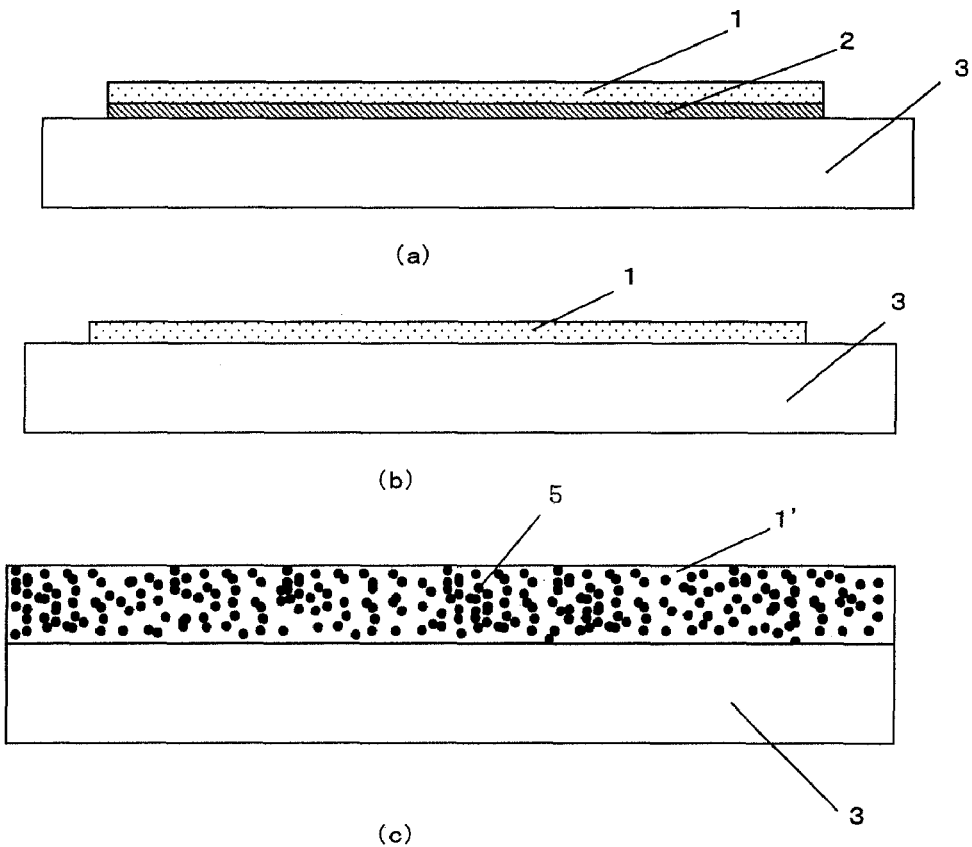
FIG. 1 is a set of schematic cross-sectional views each showing a constitution of the present invention.

FIG. 1 shows examples in each of which phase-change substance film 1 is formed on object 3; substrate substance film 2 and phase-change substance film 1 are laminated on object 3 in that order (FIG. 1(a)). Here, the portion of phase-change substance film 1 and substrate substance film 2 forms a thermal control device. Substrate substance film 2 is preferably made of a substrate substance having better adhesion than the adhesion between the phase-change substance and object 3. When $(A_{1-x}B_x)Mn_{1+y}O_3$ is used as the phase-change substance, depending on the material for object 3, there may be formed, as substrate substance film 2, either a first substrate substance film made of zirconium oxide, aluminum oxide, magnesium oxide, lanthanum oxide, tantalum oxide, or silicon nitride; or a second substrate substance film made of strontium titanate, lead zirconate titanate, lead lanthanum zirconate titanate, or lanthanum aluminate. Alternatively, there may be formed, on object 3, the first substrate substance film made of zirconium oxide, aluminum oxide, magnesium oxide, lanthanum oxide, tantalum oxide, or silicon nitride; and the second substrate substance film made of strontium titanate, lead zirconate titanate, lead lanthanum zirconate titanate, or lanthanum aluminate, in that order.

When used in the thermal control device, the material for the first substrate substance film is preferably a material having high thermal conductivity. From this point of view, more preferred is zirconium oxide, aluminum oxide, magnesium oxide, lanthanum oxide, tantalum oxide, or metal.

The second substrate substance film made of strontium titanate, lead zirconate titanate, lead lanthanum zirconate titanate or lanthanum aluminate is relatively close in crystalline structure and lattice constant. Thus, when the phase-change substance film is formed by a thin film formation method, the formation of the phase-change substance film can lower the film formation temperature than that for to the formation on object 3 or the first substrate substance film.

When concrete, aerated light-weight concrete, earthenware or the like is used as a material for object 3, phase-change substance film 1 can also be directly formed on object 3 because there is no problem for the adhesion of the object to the phase-change substance film (FIG. 1(b)).

In addition, phase-change substance plate 1', in which phase-change substance particles 5 are dispersed in resin, concrete or glass, may also be applied to object 3 (FIG. 1(C)).

The phase-change substance may also be dispersed in a heat-insulating material such as glass and resin and then made into a fiber form. The example shown in FIG. 1(c) may be phase-change substance plate 1' in which the phase-change substance, which is dispersed in an organic resin, glass or the like and then is processed into a fiber form, e.g. glass wool-like shapes, is placed. Here, to allow the phase-change substance to contact the outside environment to some extent, the ratio (weight ratio) of the phase-change substance to the heat-insulating material is preferably 0.5 or more, more preferably 1 or more.

Further, a thermal control device containing a phase-change substance, which is shaped into a plate or block form, can also be used per se as an object. Specifically, this thermal control device can be used per se as a building material such as an exterior wall and a roof tile. For the purpose of reducing the weight, the building material may contain voids to such a degree that it is not problematic in strength.

Figure 2:
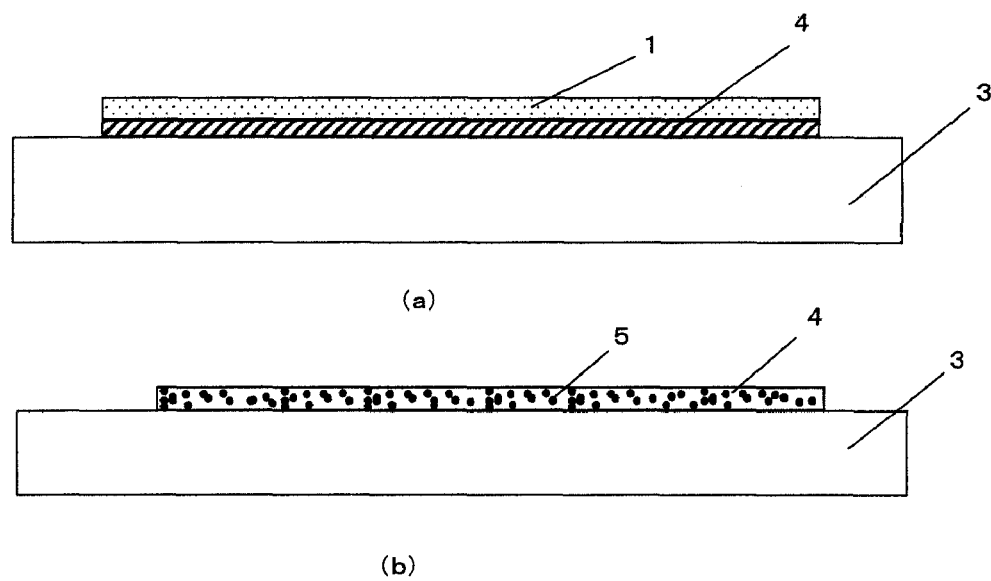
FIG. 2 is a set of schematic cross-sectional views each showing a constitution of the present invention.

FIG. 2 shows an example in which phase-change substance film 1 is formed on one side of an organic resin thin film (base film 4) while the base film 4 is applied to object 3 via the adhesive film formed on the other side.

Phase-change substance film 1 is formed on base film 4 of an organic resin thin film (FIG. 2(a)). In the case of formation on base film 4, phase-change substance film 1 can be formed thereon without problems even not via substrate substance film 2 because base film 4 has good adhesion to phase-change substance film 1.

Phase-change substance 5 may also be dispersed in the base film, followed by applying, to object 3, the phase change film 4' in which phase-change substance 5 is dispersed (FIG. 2(b)).

The phase-change substance film can be formed on the organic resin film by applying the phase-change substance in a paste form thereon so as to provide a film thickness of 250 nm after solidification and then solidifying the paste at 150° C. for 24 hours.

Methods for producing the structures shown in FIGS. 1 and 2 are then described.

The phase-change substance can be produced using a sintering method involving sintering raw material oxides and carbonates, a sol-gel method, a PLD (Pulsed Laser Deposition) method, or the like. These methods are suitable when the phase-change substance is made into a plate or block form. The substance may be molded into a necessary form from the beginning, or the form may be cut out of a molding thereof. For example, a phase-change substance plate with the thickness of 0.03 to 1 mm may also be cut out of a sintered phase-change substance and laminated as a thermal control device on an object.

The resultant phase-change substance may also be pulverized into the form of particles; and the particles may be further mixed to a binder or the like, which is then made into a film or plate form.

The phase-change substance film may also be formed on the substrate substance film or directly on the object by an oxide thin film formation method such as vapor deposition, sputtering, aerosol deposition, sol-gel and PLD methods. These methods are suitable when the phase-change substance is made into a film form.

The substrate substance film can be formed on the object by a sputter method or a CVD method.

When formed using a sputter method or a CVD method, the film comprising zirconium oxide, aluminum oxide, magnesium oxide, lanthanum oxide, tantalum oxide, or silicon nitride providing the first substrate substance film preferably has a thickness of 10 to 100 nm, more preferably 20 to 50 nm, in view of adhesion or the like.

In order to reduce the film formation temperature in forming the phase-change substance film, when the film made of strontium titanate, lead zirconate titanate, lead lanthanum zirconate titanate or lanthanum aluminate providing the second substrate substance film is formed on the object or first substrate substance film using the sputter or CVD method similarly to the first substrate substance film, the second substrate substance film preferably has a thickness of 10 to 100 nm, more preferably 20 to 50 nm.

When the first substrate substance film and second substrate substance film are laminated on the object, the sum of thicknesses of the first substrate substance film and second substrate substance film is preferably 20 to 200 nm, more preferably 40 to 100 nm.

When the substrate substance, for example zirconium oxide, can be made into a plate form, it may also be applied in the form of a substrate substance plate with a thickness of about 10 μm via an adhesive. The layer made of a substrate substance, formed as the substrate substance film or plate, is herein referred to as a substrate substance layer.

Examples of the building material as a material for the object include glass, concrete, aerated light-weight concrete, and earthenware. The glass is used as a windowpane for admitting light into a room, and the concrete or aerated light-weight concrete is employed as a wall material. The wall material is sometimes called a board when it has thin thickness. The earthenware is used as a roof tile or the like.

When the sintering method is used to produce the phase-change substance film, taking $(La_{1-x}Sr_x)Mn_{1+y}O_3$ for example, raw material oxides and carbonates ($La_2O_3$, $SrCO_3$ and $Mn_3O_4$) are weighed into a desired composition ratio, mixed and calcined at 1,000 to 1,200° C. After calcination, the calcined phase-change substance can be pulverized using a ball mill or the like to be in a powder form. The powder is then mixed with a binder such as ethyl cellulose to be in a paste form, followed by applying the paste to the object or substrate substance film before sintering to form the phase-change substance film.

The phase-change substance film preferably has a thickness of 0.05 to 100 μm, more preferably 0.1 to 30 μm. The thickness of 0.05 μm or more does not make extremely smaller the thermal emittance change Δε around the transition point Tc; the thickness of 0.1 μm or more renders the thermal emittance change Δε around Tc comparable to the thermal emittance change Δε when the stoichiometric ratio is not altered. The upper limit of the thickness is not determined by the thermal emission characteristic; however, too much thickness is not preferable because the weight of the thermal control device increases due to a high density, 6 g/cm$^3$, of the phase-change substance film the material cost becomes cost too high due to a high material unit price per gram of the phase-change substance. Thus, the thickness is preferably 100 μm or less, more preferably 30 μm or less.

Taking a concrete board used as an exterior wall of a building for example as the object, the method for producing the structures in FIGS. 1(a) and (b) will be more specifically described.

A paste, in which the phase-change substance is mixed, is applied to a commercial zirconium oxide plate with a thickness of 50 μm attached to a concrete board so as to provide a film thickness of 5 μm after sintering, followed by sintering at 1,200° C. to complete a thermal control device having the structure in FIG. 1(a). When the weight of zirconium oxide (substrate substance) is a problem, a thick film of the phase-change substance is preferably formed on the zirconium oxide substrate, followed by thinning the substrate to a thickness of about 25 μm by grinding or the like before attachment to the concrete board.

For the above structure, the paste, in which the phase-change substance is mixed, may be directly applied to the concrete board so as to provide a film thickness of 5 μm after sintering, followed by sintering at 700 to 1,500° C. Here, a thermal control device having the structure in FIG. 1(b) can be obtained.

A sintering temperature of 700° C. or higher enables the formation of the phase-change substance film and a substrate substance film to be described. The upper limit of the sintering temperature is not particularly limited to 1,500° C., and 1,500° C. or higher is not a problem; however, the temperature need not exceed 1,500° C. because more than 1,500° C. causes the losing of the design margin of a furnace body for sintering, a heater or the like.

When the phase-change substance film is formed on the object using the sintering method, a sintering temperature of 700° C. or higher provides a flat film irrespective of the particle diameter, which eliminates the need for particularly specifying the particle diameter.

Phase-change substance plate 1', in which phase-change substance particles 5 are dispersed in resin, ceramic or glass, can also be laminated on object 3 to produce a thermal control device having the structure in FIG. 1(c). Phase-change substance plate 1' can also be used, per se, as the object.

The structure in FIG. 2 is a phase-change substance film formed on an organic resin base film.

A paste, in which the phase-change substance particles are mixed, is applied to one side of an organic resin base film with a thickness of 25 μm so as to provide a film thickness of 5 μm after drying, followed by drying at 150° C. for 24 hours to give a phase change film having a formed phase-change substance film.

When it is used in a window film for applying to glass, the phase-change substance film is preferably thin in view of transmission and the like, and preferably has a thickness of about 2 to 10 μm. When it is applied to a building material or the like, and the phase-change substance film preferably has a thickness of up to 75 μm or less, more preferably up to 50 μm or less after solidification.

A film thickness of not more than 75 μm after solidification does not make the weight of the building material too heavy and therefore does not interfere with operations.

In this case, a paste, in which particles of a pulverized phase-change substance are mixed with an organic resin, is preferably used. The organic resin is not particularly limited provided that it is a material capable of being made in a paste form in a state in which the phase-change substance particles are mixed therewith; however, a thermoset resin is preferably used in view of adhesion in an applied state.

The phase-change substance film is required to have surface flatness when the object is glass; thus, the maximum value of the particle diameter of the substance is preferably smaller than the thickness of the thermoset resin film formed by solidification and more preferably 85% or less, still more preferably 60% or less of the film thickness.

In contrast, the phase-change substance film is not required to have surface flatness when the object is other than glass; thus, the phase-change substance preferably has a particle diameter of such a degree that after solidification, it is not lost from the thermoset resin when phase-change substance particles are excessively exposed from the surface of the thermoset resin and a mechanical impact is applied to the surface. In this case, the particle diameter of the phase-change substance is preferably 120% or less, more preferably 100% or less, still more preferably 80% or less of the film thickness of the thermoset resin after solidification.

For the purpose of applying the phase change film to the object, an adhesive film can be formed on the side of the phase change film, which is opposite of the side on which the phase-change substance film is formed, followed by applying the phase change film to the object via the adhesive film, thereby providing the structure in FIG. 2(a).

When the phase change film is required to have transparency in the visible light range, a resin having high transparency such as polycarbonate resin and methacrylic resin is preferably used as the organic resin; a suitable organic resin can be properly selected according to the intended use of the phase change film.

The adhesive film will not be described in detail because a conventional adhesive film can be used.

In the method for producing the structure in FIG. 2(a), it has been described that an adhesive film is formed on the surface of a base film, which is then applied to an object.

However, the adhesive film may be formed on the side of the object to which the phase change film is to be applied, followed by applying the phase change film thereto.

The phase-change substance may also be mixed in an organic resin to form a phase change film with a thickness of 25 μm, followed by forming an adhesive film on one side thereof before application to an object.

In this case, if the phase change film is formed in a roll form and directly applied to the object from the roll, the phase change film can be extremely thinned into a thickness of about 1 to 5 μm because the phase change film can be applied under tension. On the other hand, if the thin film is applied to the object in the fashion that wall paper is applied, the phase change film preferably has a thickness of 15 μm or more to keep the flatness of the phase change film.

When the phase change film is applied to the object, it preferably has a film thickness of about 15 to 100 μm. If the phase change film is made in the form of a plate having a thickness of about 1 mm, it can also be used to make the same structure as that in which a phase-change substance plate in which phase-change substance particles are dispersed is applied to an object similarly to FIG. 1(c). Phase-change substance plate 1' can also be used, per se, as the object.

When the paste is formed, the ratio of the binder resin to the phase-change substance or the ratio of the organic resin (thermoset resin) thereto is not particularly limited; they have only to be compounded so that the film thickness for making into a desired thickness after sintering or solidification is made uniform by the application. When the paste is applied to the organic resin film before solidification, an insufficient ratio of the phase-change substance to the thermoset resin does not enable the function of the phase-change substance to be sufficiently exhibited; thus, preferred is 30% by weight or more, more preferably 50% by weight or more. The upper limit has only to provide uniform film thickness and applicable viscosity and can be properly selected depending on the film thickness formed and the properties of the thermoset resin used.

It will be described how heat control is carried out in the heat control device having the structure in FIG. 1(a).

The thermal control device of the present invention is then described below, referring to a specific example using a concrete board as an object.

When the temperature of object 3 (concrete board) is raised, the heat transfers via substrate substance film 2 to make the temperature of phase-change substance film 1 is raised and to increase the thermal emittance thereof. This causes the emission of heat from the phase-change substance film to the outside to prevent the temperature elevation of object 3. In contrast, when the temperature of object 3 is lowered, the temperature of phase-change substance film 1 is lowered to reduce the thermal emittance thereof. This causes the decrease of the emission of heat from the surface of phase-change substance film 1 to prevent the temperature reduction of object 3.

When glass is used as the building material, the glass is employed as a windowpane. When the phase-change substance film is used in the windowpane, it is required to transmit light to some degree. Because the phase-change substance film has a low transmittance, it cannot sometimes transmit visible light under the same conditions as used in other building materials. Thus, an example using the phase-change substance film in a windowpane will be described in detail as a modification of the above embodiment.

The phase-change substance of the present invention is an Mn-containing perovskite oxide represented by $(A_{1-x}B_x)Mn_{1+y}O_3$ which is obtained by altering the stoichiometric ratio of Mn in an Mn-containing perovskite oxide represented by $(A_{1-x}B_x)MnO_3$. The relation between the film thickness and transmittance and the relation between the film thickness and $\Delta\epsilon$ are roughly comparable between the Mn-containing perovskite oxides represented by $(A_{1-x}B_x)Mn_{1+y}O_3$ and $(A_{1-x}B_x)MnO_3$. Thus, these relations will be described using $(La_{1-x}Sr_x)MnO_3$.

Figure 5:
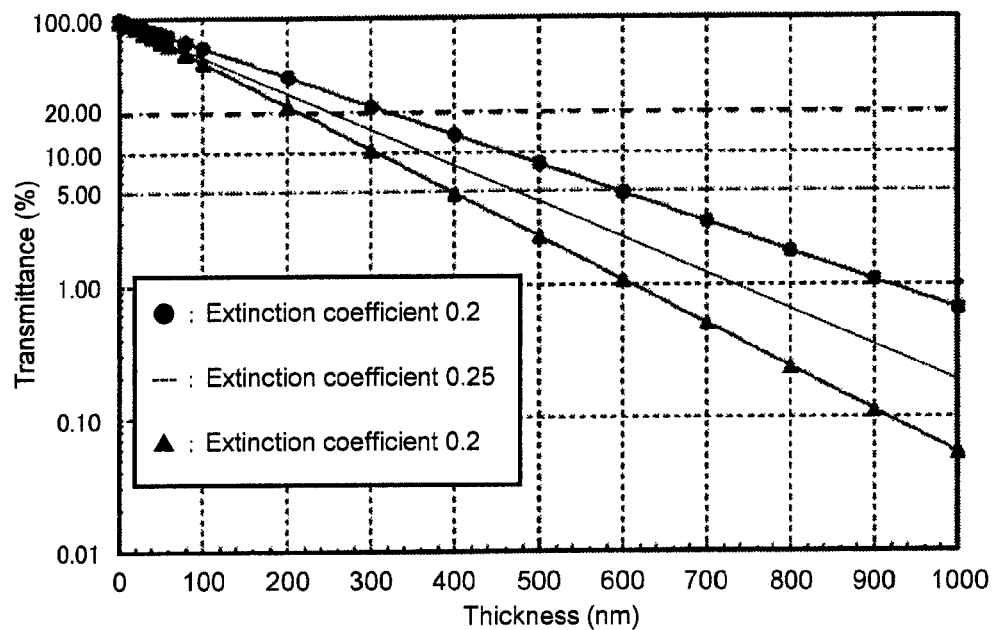
FIG. 5 is a graph showing the relation between the film thickness and transmittance of a $(La_{1-x}Sr_x)MnO_3$ film.

For a $(La_{1-x}Sr_x)MnO_3$ film, the relation between the thickness and transmittance is shown in FIG. 5.

The transmittance (p) of an optical thin film can be calculated from equation (1):

$$p = \exp(-4\pi k \cdot d/\lambda) \quad (1)$$

in the equation (1), k is an extinction coefficient; d is the thickness of a substance; and λ is a wavelength of light in vacuum.

The extinction coefficient (k) of $(La_{1-x}Sr_x)MnO_3$ is about 0.2 to 0.3 in the wavelength range of 0.25 to 0.8 μm which is the visible light area.

FIG. 5 shows the relation between the film thickness and transmittance of the $(La_{1-x}Sr_x)MnO_3$ film at the wavelength λ of 0.5 μm when the extinction coefficient (k) is set to 0.2, 0.25, or 0.3. The following is described by setting the extinction coefficient (k) to 0.25.

When $(La_{1-x}Sr_x)MnO_3$ is used as a phase-change substance for the windowpane, it preferably has a transmittance of 5% or more, more preferably 20% or more, still more preferably 30% or more.

The transmittance of 5% or more enables light from the outside to be taken in a room and therefore makes it possible to look outside from inside the room. The transmittance of 20% or more does not significantly allow something different from conventionally used windowpanes to be felt; the transmittance of 30% or more provokes no such feeling.

A film thickness of 500 nm or less can secure a transmittance of 5%; 250 nm or less and 200 nm or less can virtually secure transmittances of 20% and 30%, respectively.

Figure 6:
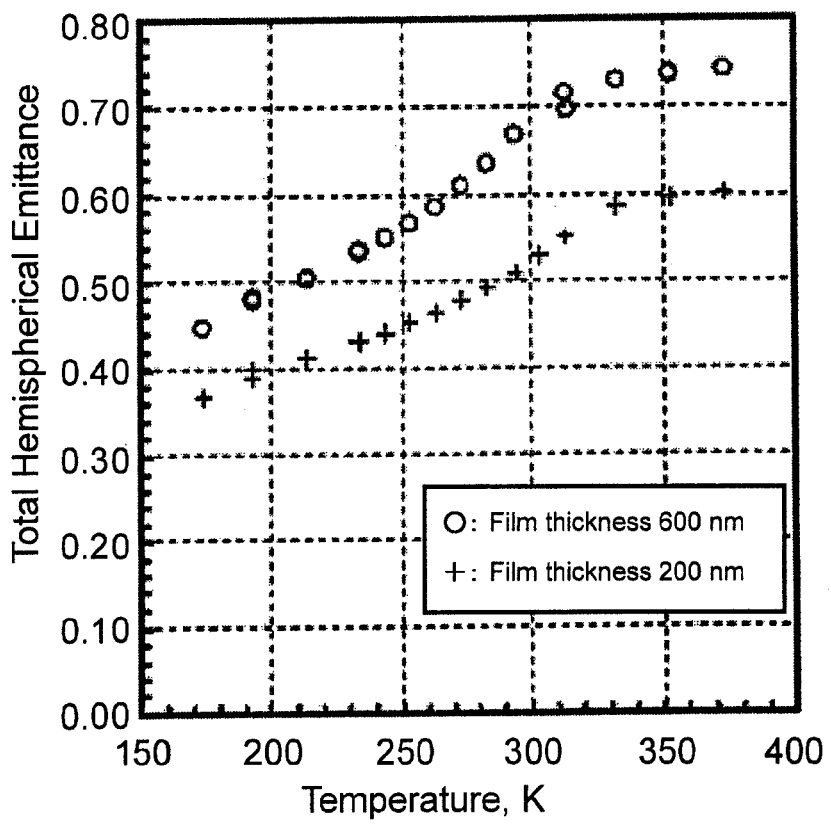
FIG. 6 is a graph showing the temperature characteristics of emittance of $(La_{1-x}Sr_x)MnO_3$ films having thicknesses of 200 nm and 600 nm.

FIG. 6 is a graph showing the temperature characteristics of emittance of phase-change substance films having thicknesses of 200 nm and 600 nm. A thinner film thickness tends to increase Tc and decrease $\Delta\epsilon$; however, it is not a significant problem in the case of the film thickness of 200 nm, and there is confirmed no problem in the case of the film thickness of down to 100 nm. A film thickness of less than 100 nm, particularly less than 50 nm, decreases $\Delta\epsilon$ and eliminates the difference of the emittance due to temperature.

As a result, the film thickness is preferably 50 to 500 nm, more preferably 100 to 250 nm.

When a sintering method is used, a sintering temperature of 700° C. or lower makes the sintering of the phase-change substance insufficient; thus, the glass plate forming a base for the windowpane preferably has a softening point of 700° C. or higher. A glass plate made of borosilicate glass or quartz glass is preferably used.

The functions of windowpanes having the structures in FIGS. 1(a) and (b) will be described. The windowpane in FIG. 1(a) is different from that in FIG. 1(b) in that the substrate substance film is formed between the glass plate and the phase-change substance film, but performs the same operation as the glass plate having the structure in FIG. 1(a), which is not provided with a substrate substance film, because the substrate substance film has a sufficiently thin thickness compared to the glass plate.

When phase-change substance film 1 has a higher temperature than the transition temperature Tc, the film 1 has a high emittance, which increases the heat-emitting amount of the windowpane.

In contrast, when phase-change substance film 1 has a lower temperature than the transition temperature Tc, the film 1 has a reduced emittance, which decreases the heat-emitting amount of the windowpane.

As a result, the use of the windowpane having a structure in FIG. 1 as a windowpane in a house or the like:

1. eliminates the cooling of the indoor in the Hokkaido-Tohoku region or a cold upland, where the outside air temperature is relatively low in summer and allowing the windows to be closed makes the indoor temperature higher than the outside air temperature, because it can reduce the temperature in a window-closed state; and 2. in the case of 1, cannot necessarily enhance the efficiency of cooling because it promotes the flow of heat from the outdoor into the indoor.

In addition, using a Low-E glass in a windowpane of an automobile to form the phase transition substance film of the present invention thereon can reduce the elevation of the temperature in the automobile to the outside air temperature or more even when the parking is carried out under the burning sun in summer.

The windowpane having the structure in FIG. 1(a) and using a glass plate made of borosilicate glass as an object can be produced by the following method.

In a case where $(La_{1-x}Sr_x)Mn_{1+y}O_3$ is used as an Mn-containing perovskite oxide, raw material oxides and carbonates ($La_2O_3$, $SrCO_3$ and $Mn_2O_3$) are weighed into a desired composition ratio, mixed and calcined at 1,000 to 1,200° C. After calcination, the calcined phase-change substance can be pulverized using a ball mill or the like to be in a powder form. The powder is then mixed with a binder resin such as ethyl cellulose to be in a paste form, followed by applying the paste to the glass plate or substrate substance film to form a phase-change substance film.

When a window film, in which a phase-change substance film is formed on a base film of an organic resin film as in FIG. 2, is applied to a glass plate, the base film is preferably a heat-resistant resin having high transparency; preferred is an acrylic resin or a cyclic olefin resin.

When the window film is made in a roll form and directly applied to the glass plate from the roll, the base film can be extremely thinned into a thickness of about 1 to 5 µm because the window film can be applied under tension. On the other hand, when the thin film is applied to an object in the fashion that wall paper is applied, the base film preferably has a thickness of 15 µm or more to keep the flatness of the window film.

When the window film is applied to an object, it preferably has a film thickness of about 15 to 100 µm.

An adhesive film (not shown) is preferably formed on the side of the organic resin film, which is opposite of the side on which the phase-change substance film is formed. When the organic resin film is applied to the glass plate from the roll, the adhesive film may be formed on the glass plate.

The thickness of the base film is similar even when the object is that other than the glass plate, such as, for example, concrete.

EXAMPLES

Example 1

A sample to be measured for the thermal emittance was prepared by the following procedure. $La_2O_3$, $SrCO_3$, $Mn_3O_4$ and $CaCO_3$, which were raw material oxides and carbonates, were first weighed and mixed so as to provide the composition ratio of $(La_{0.78}Sr_{0.12}Ca_{0.10})Mn_{1+0.05}O_3$. The mixture was then calcined at 1,000° C. to 1,200° C. and pulverized. Subsequently, the resultant powder was further pulverized and mixed with a binder resin at the weight ratio of 1:1 to make a paste. The paste was then applied to a zirconia substrate material of 40 mm square using a screen printing method so as to provide a thickness of 10 µm after sintering, followed by sintering it at 1,000° C. for 120 minutes.

Comparative Example 1

$La_2O_3$, $SrCO_3$, $MnO_2$ and $CaCO_3$, which were raw material oxides and carbonates, were first weighed and mixed so as to provide the composition ratio of $(La_{0.78}Sr_{0.12}Ca_{0.10})MnO_3$. The mixture was then calcined at 1,000° C. to 1,200° C. and pulverized. Subsequently, the resultant powder was further pulverized and mixed with a binder resin at the weight ratio of 1:1 to make a paste. The paste was then applied to a zirconia substrate material of 40 mm square using a screen printing method so as to provide a thickness of 10 µm after sintering, followed by sintering it at 1,000° C. for 120 minutes.

FIG. 3 shows the results of measuring the thermal emittance of the samples of Comparative Example 1 and Example 1 in the temperature range between 170 K and 380 K.

As shown in FIG. 3, the Tc in Comparative Example 1 was 320 K, and the Tc in Example 1 was 334 K.

In $(La_{0.78}Sr_{0.12}Ca_{0.10})Mn_{1+0.05}O_3$ obtained by changing the Mn ratio from the stoichiometric ratio while allowing the main composition ratio to remain fixed, Tc could be raised without changing the change tendency of the emittance around the transition temperature and the change width $\Delta\epsilon$ of the emittance between the higher and lower temperature sides of $(La_{0.78}Sr_{0.12}Ca_{0.10})MnO_3$, which has the stoichiometric Mn ratio.

The invention claimed is:

1. A thermal control device having a phase-change substance layer for controlling a temperature of an object by forming the layer on the object, in which the phase-change substance layer comprises a phase-change substance, which has an insulating property in a higher-temperature phase and has a metallic property in a lower-temperature phase, and which has a larger heat-emitting amount in the higher-temperature phase and has a smaller heat-emitting amount in the lower-temperature phase, wherein:

the thickness of the phase-change substance layer is in the range of 200 nm and 100 µm, and the phase-change substance is an Mn-containing perovskite oxide represented by $(A_{1-x}B_x)Mn_{1+y}O_3$, in which a phase-transition temperature of the Mn-containing oxide represented by $(A_{1-x}B_x)Mn_{1+y}O_3$ is higher than that of an Mn-containing perovskite oxide represented by $(A_{1-x}B_x)MnO_3$;

A represents at least one of rare-earth ions of La, Pr, Nd, and Sm;

B represents any one of (a) Ba, (b) Ca and Sr, (c) Ca and Ba, (d) Sr and Ba, and (e) Ca, Sr and Ba;

$0 \leq x < 1$; and $0.005 \leq y \leq 0.1$.

2. The thermal control device according to claim 1, wherein the thermal control device is composed of the phase-change substance layer and a substrate substance layer made of a substrate substance; and the substrate substance layer and the phase-change substance layer are formed on the object in that order.

3. The thermal control device according to claim 2, wherein the substrate substance is zirconium oxide, aluminum oxide, magnesium oxide, lanthanum oxide, tantalum oxide, or silicon nitride.

4. The thermal control device according to claim 2, wherein the substrate substance is strontium titanate, lead zirconate titanate, lead lanthanum zirconate titanate, or lanthanum aluminate.

5. The thermal control device according to claim 2, wherein the substrate substance layer is composed of a first substrate substance layer made of zirconium oxide, aluminum oxide, magnesium oxide, lanthanum oxide, tantalum oxide, or silicon nitride, and of a second substrate substance layer made of strontium titanate, lead zirconate titanate, lead lanthanum zirconate titanate, or lanthanum aluminate; and
the first substrate substance layer, the second substrate substance layer and the phase-change substance layer are formed on the object in that order.

6. The thermal control device according to claim 1, wherein the object is a building material.

7. A thermal control device comprising a phase-change substance for controlling the own temperature thereof, in which the phase-change substance has an insulating property in a higher-temperature phase and has a metallic property in a lower-temperature phase, and has a larger heat-emitting amount in the higher-temperature phase and a smaller heat-emitting amount in the lower-temperature phase, wherein:
the thickness of the thermal control device is in the range of 200 nm and 100 μm, and
the phase-change substance is an Mn-containing perovskite oxide represented by $(A_{1-x}B_x)Mn_{1+y}O_3$, in which a phase-transition temperature of the Mn-containing oxide represented by $(A_{1-x}B_x)Mn_{1+y}O_3$ is higher than that of an Mn-containing perovskite oxide represented by $(A_{1-x}B_x)MnO_3$;
A represents at least one of rare-earth ions of La, Pr, Nd, and Sm;
B represents any one of (a) Ba, (b) Ca and Sr, (c) Ca and Ba, (d) Sr and Ba, and (e) Ca, Sr and Ba;
$0 \leq x < 1$; and $0.005 \leq y \leq 0.1$.

8. The thermal control device according to claim 7, wherein the thermal control device is a building material.

9. A thermal control device having a phase-change substance layer for controlling a temperature of an object by forming the layer on the object, in which the phase-change substance layer comprises a phase-change substance, which has an insulating property in a higher-temperature phase and has a metallic property in a lower-temperature phase, and which has a larger heat-emitting amount in the higher-temperature phase and has a smaller heat-emitting amount in the lower-temperature phase, wherein:
the thickness of the phase-change substance layer is in the range of 200 nm and 100 μm, and
the phase-change substance is an Mn-containing perovskite oxide represented by $(A_{1-x}B_x)Mn_{1+y}O_3$, in which a phase-transition temperature of the Mn-containing oxide represented by $(A_{1-x}B_x)Mn_{1+y}O_3$ is higher than that of an Mn-containing perovskite oxide represented by $(A_{1-x}B_x)MnO_3$;
A represents at least one of rare-earth ions Pr, Nd and Sm;
B represents at least one of alkaline-earth ions of Ca, Sr, and Ba;
$0 \leq x < 1$; and $0.005 \leq y \leq 0.1$.

10. A thermal control device comprising a phase-change substance for controlling the own temperature thereof, in which the phase-change substance has an insulating property in a higher-temperature phase and has a metallic property in a lower-temperature phase, and has a larger heat-emitting amount in the higher-temperature phase and a smaller heat-emitting amount in the lower-temperature phase, wherein:
the thickness of the thermal control device is in the range of 200 nm and 100μm, and
the phase-change substance is an Mn-containing perovskite oxide represented by $(A_{1-x}B_x)Mn_{1+y}O_3$, in which a phase-transition temperature of the Mn-containing oxide represented by $(A_{1-x}B_x)Mn_{1+y}O_3$ is higher than that of an Mn-containing perovskite oxide represented by $(A_{1-x}B_x)MnO_3$;
A represents at least one of rare-earth ions Pr, Nd and Sm;
B represents at least one of alkaline-earth ions of Ca, Sr, and Ba;
$0 \leq x < 1$; and $0.005 \leq y \leq 0.1$.

* * * * *

UNITED STATES PATENT AND TRADEMARK OFFICE
CERTIFICATE OF CORRECTION

PATENT NO. : 7,981,532 B2
APPLICATION NO. : 12/088389
DATED : July 19, 2011
INVENTOR(S) : Toru Mori et al.

It is certified that error appears in the above-identified patent and that said Letters Patent is hereby corrected as shown below:

In the Specification

Column 2, Line 67: delete "$0 \leqq x \leqq 1$" and insert -- $0 \leq \times < 1$ --

Column 3, Line 4: delete "$0 \leqq x \leqq 1$" and insert -- $0 \leq \times < 1$ --

Column 3, Line 20: delete "$0 \leqq x \leqq 1$" and insert -- $0 \leq \times < 1$ --

Column 3, Line 24: delete "$0 \leqq x \leqq 1$" and insert -- $0 \leq \times < 1$ --

Column 4, Line 30: delete "$0 \leqq x \leqq 1$" and insert -- $0 \leq \times < 1$ --

Signed and Sealed this
Fifteenth Day of April, 2014

Michelle K. Lee
*Deputy Director of the United States Patent and Trademark Office*